US011537200B2

(12) United States Patent
Yan et al.

(10) Patent No.: US 11,537,200 B2
(45) Date of Patent: Dec. 27, 2022

(54) HUMAN-MACHINE INTERACTION METHOD, SYSTEM, PROCESSING DEVICE AND COMPUTER READABLE STORAGE MEDIUM

(71) Applicants: BEIJING BOE OPTOELECTRONICS TECHNOLOGY CO., LTD., Beijing (CN); BOE Technology Group Co., Ltd., Beijing (CN)

(72) Inventors: Guixin Yan, Beijing (CN); Jiankang Sun, Beijing (CN); Lili Chen, Beijing (CN); Hao Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/359,677

(22) Filed: Jun. 28, 2021

(65) Prior Publication Data
US 2022/0155859 A1 May 19, 2022

(30) Foreign Application Priority Data
Nov. 17, 2020 (CN) .......................... 202011283261.0

(51) Int. Cl.
*G06F 3/01* (2006.01)
*G06T 19/00* (2011.01)
(Continued)

(52) U.S. Cl.
CPC .............. *G06F 3/013* (2013.01); *G06F 3/017* (2013.01); *G06T 7/80* (2017.01); *G06T 19/006* (2013.01); *G06V 40/107* (2022.01); *G06V 40/171* (2022.01); *G06V 40/193* (2022.01); *G06V 40/28* (2022.01)

(58) Field of Classification Search
CPC . G06F 3/013; G06F 3/017; G06T 7/80; G06T 19/006; G06V 40/107; G06V 40/171; G06V 40/193; G06V 40/28
See application file for complete search history.

(56) References Cited

U.S. PATENT DOCUMENTS

| 2012/0154538 A1* | 6/2012 | Hasegawa ............ H04N 13/128 348/46 |
| 2013/0283213 A1* | 10/2013 | Guendelman ......... G06F 3/0486 715/848 |

(Continued)

*Primary Examiner* — Premal R Patel
(74) *Attorney, Agent, or Firm* — Ling Wu; Stephen Yang; Ling and Yang Intellectual Property (57) ABSTRACT

Provided are a human-machine interaction method, a system, a processing device and a computer readable storage medium, wherein the method includes: controlling a 3D display to output a 3D view to present a virtual target object; receiving a user image taken by a sight tracking camera, and detecting an eye gaze region according to the user image; receiving a hand image taken by a gesture detection camera, and detecting whether a user's hand collides with the virtual target object and/or grabs the virtual target object according to the hand image; controlling playing of the 3D view according to whether human eyes gaze at the virtual target object, the user's hand collides with the virtual target, and grasps the virtual target object.

17 Claims, 4 Drawing Sheets

(51) Int. Cl.
*G06T 7/80* (2017.01)
*G06V 40/20* (2022.01)
*G06V 40/10* (2022.01)
*G06V 40/16* (2022.01)
*G06V 40/18* (2022.01)

(56) References Cited

U.S. PATENT DOCUMENTS

2014/0104274 A1\* 4/2014 Hilliges .................. G06F 30/20
345/424
2020/0301513 A1\* 9/2020 Mejia Cobo ............ G06F 3/011

\* cited by examiner

HUMAN-MACHINE INTERACTION METHOD, SYSTEM, PROCESSING DEVICE AND COMPUTER READABLE STORAGE MEDIUM

CROSS-REFERENCE TO RELATED APPLICATION

The present application claims the priority of Chinese Patent Application No. 202011283261.0 filed to the CNIPA on Nov. 17, 2020, the content of which is hereby incorporated by reference.

TECHNICAL FIELD

Embodiments of the present disclosure relate to, but are not limited to, the technical field of intelligent display, in particular to a human-machine interaction method, a system, a processing device and a computer readable storage medium.

BACKGROUND

With the continuous development of science and technology, more and more electronic media appear in different life application scenarios. In order to improve user experience, human-machine interaction has been widely concerned.

Gesture is a natural and comfortable interactive way. At present, there are many gesture control methods used to control contents displayed on the display screen. However, many gesture control methods may not truly simulate people's interactive behaviors, and the current human-machine interaction mode has poor user experience.

SUMMARY

The following is a summary of subject matters described in detail in the present disclosure. This summary is not intended to limit the protection scope of the claims.

An embodiment of the present disclosure provides a human-machine interaction method, which includes:
controlling a 3D display to output a 3D view, wherein a virtual target object is presented by the 3D view;
receiving a user image taken by a sight tracking camera, and detecting an eye gaze region according to the user image;
receiving a hand image taken by a gesture detection camera, and detecting whether a user's hand collides with the virtual target object and/or grabs the virtual target object according to the hand image; and
controlling playing of the 3D view according to whether human eyes gaze at the virtual target object, whether the user's hand collides with the virtual target object and grasps the virtual target object.

In an exemplary implementation, the sight tracking camera includes a first camera and a second camera, and detecting the eye gaze region according to the user image includes:
acquiring a user image taken by the first camera, performing face detection and landmark detection on the user image to obtain multiple face landmarks, and calculating face position and pose information according to the multiple face landmarks;
performing pupil detection on an eye region of a face to determine a pupil region;

performing binary processing on the user image, calculating an integral image of the pupil region, and determining a position of a pupil center; and
acquiring an eye image with a light spot taken by the second camera, detecting a position of the light spot, and calculating the eye gaze region according to the position of the pupil center and the position of the light spot.

In an exemplary implementation, before controlling the 3D display to output the 3D view, the method further includes:
calibrating the first camera and the second camera to obtain a first rotation translation matrix between the first camera and the second camera; and
calibrating the second camera and the gesture detection camera to obtain a second rotation translation matrix between the second camera and the gesture detection camera.

In an exemplary implementation, the method further includes performing unified processing on a camera coordinate system and a screen coordinate system with any one of the first camera, the second camera and the gesture detection camera as a baseline.

In an exemplary implementation, detecting whether the user's hand collides with the virtual target object and/or grabs the virtual target object according to the hand image includes:
preselecting multiple parts of the hand as key nodes of the hand;
acquiring the hand image taken by the gesture detection camera, determining position data of the key nodes of the hand, and detecting whether the user's hand collides with the virtual target object according to a position of the virtual target object and the position data of the key nodes of the hand; and
detecting whether the user's hand grabs the virtual target object when the user's hand collides with the virtual target object.

In an exemplary implementation, preselecting the multiple parts of the hand as key nodes of the hand, includes:
preselecting twenty-one parts of the hand as key nodes of the hand, wherein the twenty-one parts of the hand include four parts of each of five fingers, wherein a fingertip is a part, three joints correspond to three parts, and there is a part at a wrist.

In an exemplary implementation, controlling the playing of the 3D view according to whether human eyes gaze at the virtual target object, whether the user's hand collides with the virtual target object and grasps the virtual target object includes:
rendering one part of the 3D view in high definition and rendering the other part of the 3D view in low definition when human eyes gaze at the virtual target object, in this case, the one part of the 3D view corresponds to a first region around the eye gaze region when human eyes gaze at the virtual target object and the user's hand does not collide with the virtual target object; the one part of the 3D view corresponds to a second region around the eye gaze region when human eyes gaze at the virtual target object and the user's hand collides with the virtual target object, wherein the second region is greater than or equal to the first region; and
rendering the whole 3D view in low definition when human eyes do not gaze at the virtual target object.

In an exemplary implementation, the method further includes: calculating a motion vector of the user's hand when the user's hand grabs the virtual target object, and updating a position of the virtual target object according to the calculated motion vector.

In an exemplary implementation, when human eyes gaze at the virtual target object and the user's hand collides with the virtual target object, the method further includes:

determining a collision region of the user's hand on the virtual target object;

wherein the second region is centered on the eye gaze region when the eye gaze region does not overlap the collision region; and the second region is centered on a region where the eye gaze region overlaps the collision region when the eye gaze region overlaps the collision region.

In an exemplary implementation, the 3D view includes a first background display content, a second background display content, a first foreground interactive object and a second foreground interactive object, which are superimposed on each other, wherein the first background display content and the second background display content form a glasses' free 3D scene after being imaged by human eyes, and the first foreground interactive object and the second foreground interactive object form the virtual target object after being imaged by the human eyes.

An embodiment of the present disclosure provides a processing device, including a processor and a memory storing a computer program that is capable of running on the processor, wherein a human-machine interaction method is implemented when the processor executes the computer program and the human-machine interaction method includes:

controlling a 3D display to output a 3D view, wherein a virtual target object is presented by the 3D view;

receiving a user image taken by a sight tracking camera, and detecting an eye gaze region according to the user image;

receiving a hand image taken by a gesture detection camera, and detecting whether a user's hand collides with the virtual target object and/or grabs the virtual target object according to the hand image; and controlling playing of the 3D view according to whether human eyes gaze at the virtual target object, whether the user's hand collides with the virtual target object and grasps the virtual target object.

In an exemplary implementation, the sight tracking camera includes a first camera and a second camera, and detecting the eye gaze region according to the user image includes:

acquiring a user image taken by the first camera, performing face detection and landmark detection on the user image to obtain multiple face landmarks, and calculating face position and pose information according to the multiple face landmarks;

performing pupil detection on an eye region of a face to determine a pupil region; performing binary processing on the user image, calculating an integral image of the pupil region, and determining a position of a pupil center; and acquiring an eye image with a light spot taken by the second camera, detecting a position of the light spot, and calculating the eye gaze region according to the position of the pupil center and the position of the light spot.

In an exemplary the position of, before the processor executes an act of controlling the 3D display to output the 3D view, the processor further executes the following acts:

calibrating the first camera and the second camera to obtain a first rotation translation matrix between the first camera and the second camera; and calibrating the second camera and the gesture detection camera to obtain a second rotation translation matrix between the second camera and the gesture detection camera.

In an exemplary implementation, detecting whether the user's hand collides with the virtual target object and/or grabs the virtual target object according to the hand image includes:

preselecting multiple parts of the hand as key nodes of the hand;

acquiring the hand image taken by the gesture detection camera, determining position data of the key nodes of the hand, and detecting whether the user's hand collides with the virtual target object according to a position of the virtual target object and the position data of the key nodes of the hand; and detecting whether the user's hand grabs the virtual target object when the user's hand collides with the virtual target object.

In an exemplary embodiment, controlling the playing of the 3D view according to whether human eyes gaze at the virtual target object, whether the user's hand collides with the virtual target object and grasps the virtual target object includes:

rendering one part of the 3D view in high definition and rendering the other part of the 3D view in low definition when human eyes gaze at the virtual target object, in this case, the one part of the 3D view corresponds to a first region around the eye gaze region when human eyes gaze at the virtual target object and the user's hand does not collide with the virtual target object; the one part of the 3D view corresponds to a second region around the eye gaze region when human eyes gaze at the virtual target object and the user's hand collides with the virtual target object, wherein the second region is greater than or equal to the first region; and rendering the whole 3D view in low definition when human eyes do not gaze at the virtual target object.

In an exemplary implementation, controlling the playing of the 3D view according to whether human eyes gaze at the virtual target object, whether the user's hand collides with the virtual target object and grasps the virtual target object, and the processor further executes the following act: calculating a motion vector of the user's hand when the user's hand grasps the virtual target object and updating a position of the virtual target object according to the calculated motion vector.

In an exemplary implementation, when human eyes gaze at the virtual target object and the user's hand collides with the virtual target object, the processor further executes the following act:

determining a collision region of the user's hand on the virtual target object;

wherein the second region is centered on the eye gaze region when the eye gaze region does not overlap the collision region; and the second region is centered on a region where the eye gaze region overlaps the collision region when the eye gaze region overlaps the collision region.

An embodiment of the present disclosure provides a human-machine interaction system, including a sight tracking camera, a gesture detection camera, a 3D display and the processing device described above, wherein:

the sight tracking camera is configured to take a user image;

the gesture detection camera is configured to take a hand image of a user; and the 3D display is configured to output a 3D view to present a virtual target object.

In an exemplary implementation, the sight tracking camera includes a first camera and a second camera, and the human-machine interaction system further includes two infrared light sources for forming light spots on human eyes; the first camera is a red, green and blue camera, the second camera is an infrared camera and the gesture detection camera is an infrared camera.

An embodiment of the present disclosure provides a non-transitory computer readable storage medium storing computer-executable instructions thereon, and the computer-executable instructions are used for executing a human-machine interaction method, which includes:

controlling a 3D display to output a 3D view, wherein a virtual target object is presented by the 3D view;

receiving a user image taken by a sight tracking camera, and detecting an eye gaze region according to the user image;

receiving a hand image taken by a gesture detection camera, and detecting whether a user's hand collides with the virtual target object and/or grabs the virtual target object according to the hand image; and controlling playing of the 3D view according to whether human eyes gaze at the virtual target object, whether the user's hand collides with the virtual target object and grasps the virtual target object.

Other features and advantages of the present disclosure will be set forth in the following specification, and will become apparent partially from the specification, or be understood by practice of the present disclosure. Other advantages of the present disclosure can be realized and obtained by the schemes described in the specification and drawings.

Other aspects will become apparent upon reading and understanding accompanying drawings and the detailed description.

BRIEF DESCRIPTION OF DRAWINGS

Accompanying drawings are used to provide an understanding of technical schemes of the present disclosure and form a part of the specification. Together with embodiments of the present disclosure, they are used to explain the technical schemes of the present disclosure and do not constitute a limitation on the technical schemes of the present disclosure.

DETAILED DESCRIPTION

Specific implementations of the present disclosure will be described in further detail below with reference to the accompanying drawings and embodiments. The following embodiments serve to illustrate the present disclosure, but are not intended to limit the scope of the present disclosure. The embodiments and features in the embodiments in the present disclosure may be combined randomly if there is no conflict.

Figure 1:
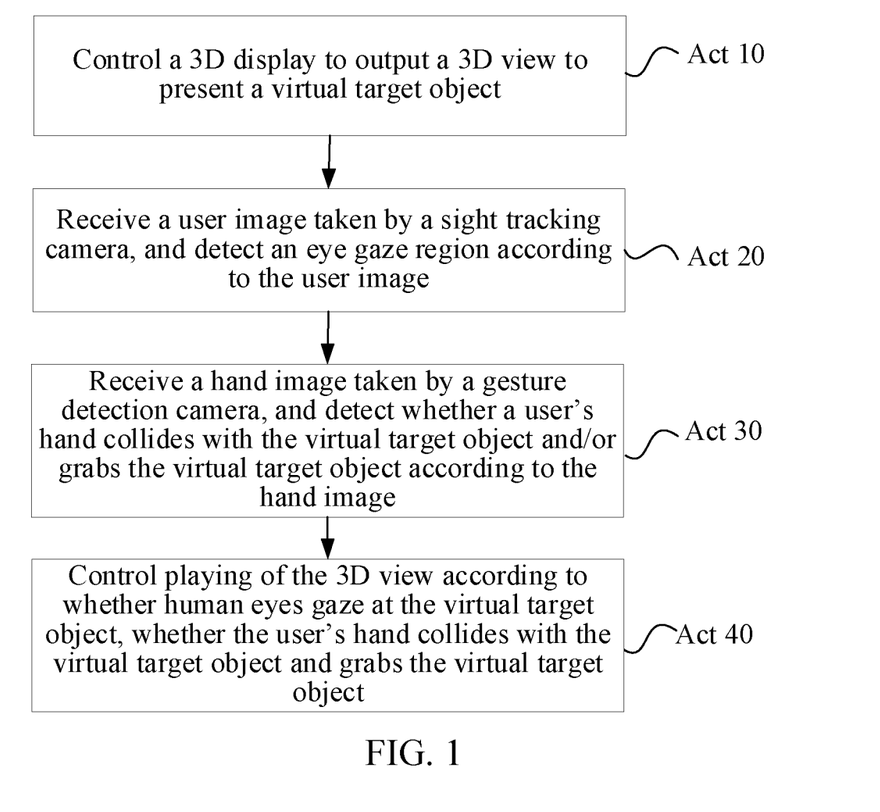
FIG. 1 is a schematic flowchart of a human-machine interaction method according to an embodiment of the disclosure.

As shown in FIG. 1, an embodiment of the present disclosure provides a human-machine interaction method, which includes acts 10 to 40.

In act 10, a 3D display is controlled to output a 3D view, wherein a virtual target object is presented by the 3D view.

In an exemplary embodiment, the 3D view includes a first background display content, a second background display content, a first foreground interactive object, and a second foreground interactive object, which are superimposed on each other. The first background display content and the second background display content form a glasses' free 3D scene after being imaged by human eyes, and the first foreground interactive object and the second foreground interactive object form the virtual target object after being imaged by human eyes.

Background and foreground interactive objects need to be set in the glasses' free 3D content in the embodiment of the present disclosure, that is, two sets of content systems are needed for content production, one for normal display content and the other for interactive objects, and the interactive objects and the background need to be superimposed together.

In an exemplary embodiment, a glasses' free 3D display may be directly used to output a left and right parallax images with parallax, so that a stereoscopic effect may be produced after the left and right parallax images with parallax are viewed by human eyes to form a virtual target object of a 3D view. Types of the glasses' free 3D display used here are not limited, as long as left and right views are provided, or other devices capable of outputting 3D views may be used to output the virtual target object in a 3D state, and a structure of the virtual target object is not limited.

Figure 2:
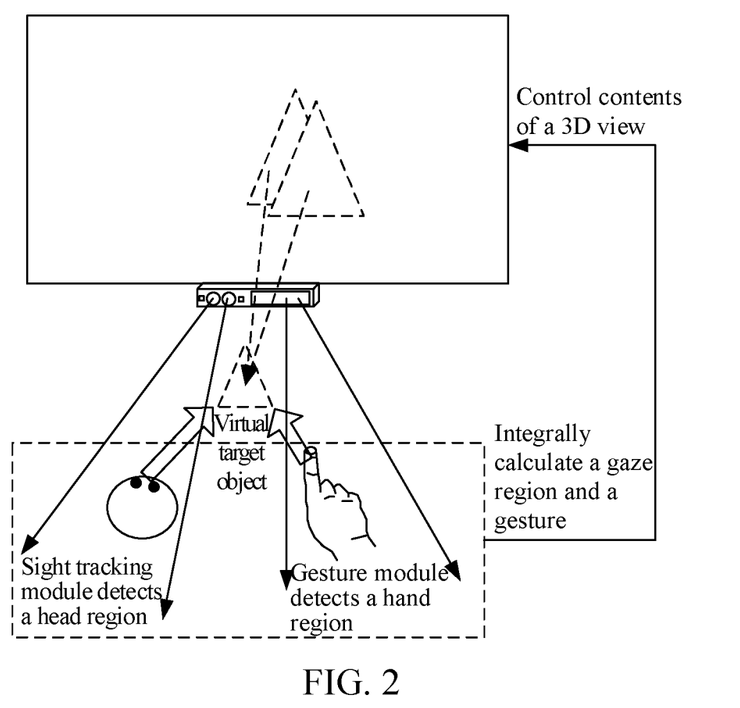
FIG. 2 is a schematic diagram of a structure of a human-machine interaction system according to an embodiment of the disclosure.

The glasses' free 3D display generates the left and right views. Due to parallax, the virtual target object seen by human eyes is presented in front of or behind a screen to form a perspective in a three-dimensional space. Since an interaction between a gesture and the virtual target object is required, a parallax value is set so that the virtual target object after the left and right views are imaged is presented in front of the display screen, as shown in FIG. 2.

In an exemplary embodiment, when a 3D view is output, a position data of the virtual target object is directly obtained through a processor or a control system.

In an exemplary embodiment, the position data of the virtual target object may be recorded in three-dimensional coordinates, for example, the position data of the virtual target object may be recorded as Obj (xobj, yobj, zobj, L), where (xobj, yobj, zobj) represents a center coordinate of the virtual target object, L represents a side length of an outer enclosing box of the virtual target object. The side length of the outer enclosing box may be considered as a distance from a position of an outermost surface of the virtual target object to the center coordinate of the virtual target object, so that the virtual target object represented by an output 3D view with any structure may be represented by coordination of the coordinate of a center position and the side length of the outer enclosing box. For example, when a sphere, cube or a specific physical structure such as a water cup is output through a 3D view, it may be represented by position data of the center coordinate and the side length of the outer enclosing box. In addition, the virtual target object whose position data is recorded as Obj (xobj, yobj, zobj, L) may be mobile, or the virtual target object may be changeable, as long as the position data changes accordingly as the object is moved or changed.

In act 20, a user image taken by a sight tracking camera is received, and an eye gaze region is detected according to the user image.

Figure 3:
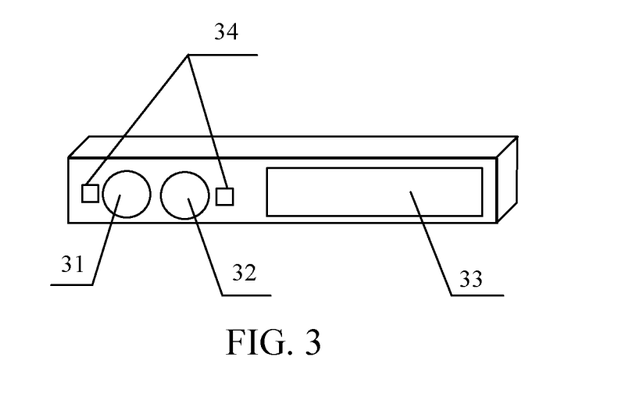
FIG. 3 is a schematic diagram of a structure of the camera module in FIG. 2.

In an exemplary embodiment, as shown in FIGS. 2 and 3, the sight tracking camera includes a first camera 31 and a second camera 32.

In an exemplary embodiment, the first camera 31 may be a red, green and blue (RGB) camera, and the second camera 32 may be an infrared radiation (IR) camera.

In an exemplary embodiment, before the act 10, the method further includes calibrating the first camera 31 and the second camera 32 to obtain a first rotation translation matrix M1 between the first camera 31 and the second camera 32.

In this embodiment, the first camera 31 and the second camera 32 may be calibrated by using Zhang Zhengyou's chessboard calibration method to obtain a rotation translation matrix from the first camera 31 to the second camera 32, which is denoted as M1, so that an image Image_rgb of the first camera 31 may be transformed into an image of the second camera 32 through M1, that is, Image_ir=M1*Image_rgb.

In an exemplary embodiment, detecting the eye gaze region according to the user image includes the following acts.

In act 201, a user image taken by the first camera 31 is acquired, a face detection and a landmark detection are performed on the user image to obtain multiple face landmarks, and face position and pose information is calculated according to the multiple face landmarks.

In act 202, pupil detection is performed on the eye region of a face to determine a pupil region; binary processing is performed on the user image, an integral image of the pupil region is calculated, and a position of a pupil center is determined.

In act 203, the eye image with a light spot taken by the second camera 32 is acquired, a position of the light spot is detected, and the eye gaze region is calculated according to the position of the pupil center and the position of the light spot.

Figure 4:
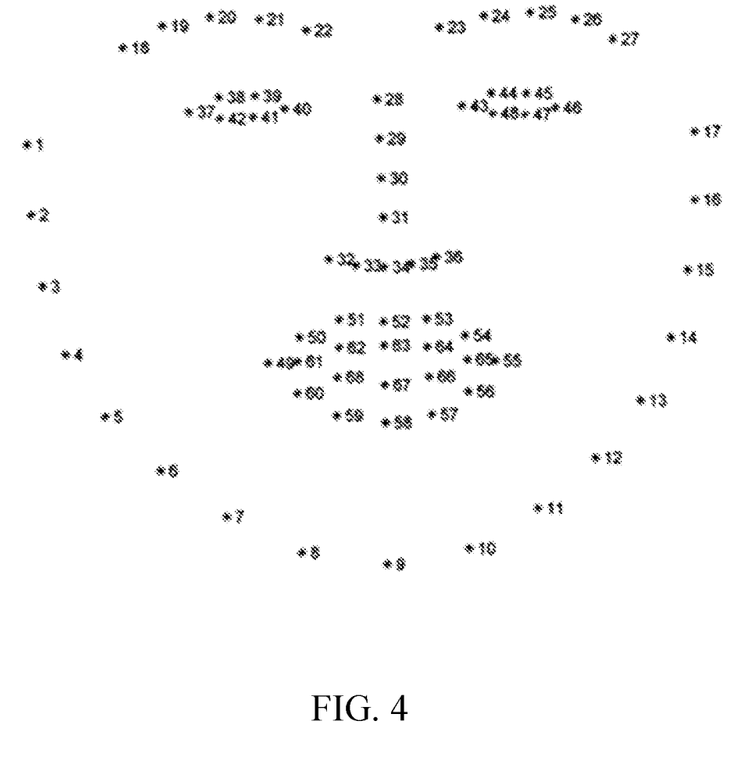
FIG. 4 is a schematic diagram of a principle of face landmark detection according to an embodiment of the present disclosure.

In an exemplary embodiment, an open source OpenCV face detection algorithm may be used to perform face detection to obtain an accurate region of the face in the user image taken by the first camera 31. The Facial Landmark Detection is performed in the obtained face region to obtain 68 facial landmarks and eye region coordinates, as shown in FIG. 4. Among these landmarks, there are landmarks representing the eye region, and outer enclosing boxes of left and right eye landmarks are respectively denoted as eyeLeft and eyeRight. According to these landmarks, a head pose solution algorithm is used to solve a position and pose of the face relative to the first camera 31 in a three-dimensional space, which is denoted as H(x, y, z). The H(x, y, z) contains three position coordinates (an abscissa, an ordinate and a distance coordinate) and three angle coordinates (a pitch angle, a yaw angle and a roll angle). Exemplarily, the head pose solution algorithm may be a Pespective n Point (PnP) algorithm.

In an exemplary embodiment, a gradient vector field approach may be used to detect the pupils in the eye region of the face (i.e., the aforementioned eyeLeft and eyeRight regions), and determine the pupil region.

In another exemplary embodiment, pupil detection may also be performed on the eye region of the face by a circle detection to determine the pupil region.

In an exemplary embodiment, binary processing is performed on the user image; an integral image of the pupil region is calculated to find the pupil centers which are respectively denoted as pupilCenterLeft and pupilCenterRight.

In an exemplary embodiment, the second camera 32 (i.e., IR camera) is started, and a position of the eye region is calculated and obtained according to the rotation translation matrix M1 from the first camera 31 (i.e., RGB camera) to the second camera 32; an infrared light source is turned on to detect positions of infrared spots on the IR image, which are denoted as L1 and L2. Three-dimensional sight lines of both eyes are calculated by using a pupil corneal reflection algorithm through the positions of the pupil centers and two light spots, and a region where the two sight lines intersect in space is the eye gaze region.

In act 30, a hand image taken by the gesture detection camera is received, and whether a user's hand collides with the virtual target object and/or grabs the virtual target object is detected according to the hand image.

In an exemplary embodiment, before the act 10, the method further includes: calibrating the sight tracking camera (exemplarily, the sight tracking camera may be the first camera 31 or the second camera 32) and the gesture detection camera to obtain a second rotation translation matrix, which is denoted as M2, between the sight tracking camera and the gesture detection camera.

In an exemplary embodiment, the method further includes performing unified processing on a camera coordinate system and a screen coordinate system with any one of the sight tracking camera (exemplarily, the sight tracking camera may be the first camera 31 or the second camera 32) and the gesture detection camera as a baseline. Exemplarily, as shown in FIG. 2, the gesture detection camera and the sight tracking camera may be fixed below the glasses' free 3D display, and the matrix causing the first camera 31 to be transformed to the screen is denoted as M3, that is, a screen image Image_screen=M3*Image_rgb.

In an exemplary embodiment, a gesture detection module may be used to detect the user's hand in coordination with the glasses' free 3D display. The detection mode may be real-time detection or detection according to a preset rule. For example, when the user's hand reaches into a preset space, the detection begins, and the detection of the user's hand includes two situations: detected and undetected. The real-time detection of the user's hand is a better scheme. When position data of key nodes is set up, it is best to set up coordinate information of the user's hand and the virtual target object in the same space, for example, coordinate information in the three-dimensional space is used as the position data for both, so that the obtained position data of the key nodes of the hand may quickly set up a spatial association with the position data of the virtual target object, thereby reducing subsequent calculation.

Figure 5:
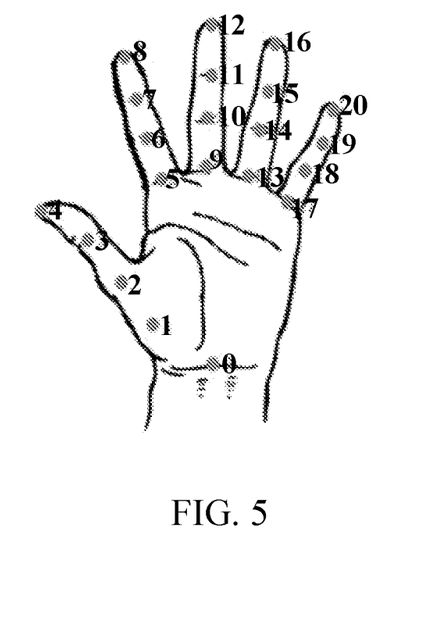
FIG. 5 is a schematic diagram of positions of key nodes of the hand according to an embodiment of the present disclosure.

In an exemplary embodiment, multiple joint points of the hand may be selected as the key nodes, and since the actions of the collision and the grabbing between the hand and the virtual target object are mainly detected, the joint points of the hand mainly working when the hand grabs the object may be preselected as key nodes. Exemplarily, as shown in FIG. 5, 21 parts of the hand may be preselected as the key nodes of the hand, and the position data of the key nodes may be set up correspondingly. As shown in FIG. 5, the 21 parts of the hand include 4 parts of each of 5 fingers, wherein each fingertip serves as 1 part, 3 joints of each finger correspond to 3 parts, and 1 part is at a wrist. The position data of the key nodes of the 21 parts of the hand are set up in the three-dimensional space where the virtual target object is located, for example, may respectively be, P0(x0, y0, z0), P1(x1, y1, z1), P2(x2, y2, z2), . . . , P20(x20, y20, z20). P1 corresponds to a finger end of a thumb, P2 corresponds to a joint of a first phalanx of the thumb, P3 corresponds to a joint of a second phalanx of the thumb, P4 corresponds to a fingertip of the thumb, P5 corresponds to a finger end of an index finger, P6 corresponds to a joint of a first phalanx of the index finger, P7 corresponds to a joint of a second phalanx of the index finger, P8 corresponds to a fingertip of the index finger, P9 corresponds to a finger end of a middle finger, P10 corresponds to a joint of a first phalanx of the middle finger, P11 corresponds to a joint of a second phalanx of the middle finger, P12 corresponds to a fingertip of the middle finger, P13 corresponds to a finger end of a ring finger, P14 corresponds to a joint of a first phalanx junction of the ring finger, P15 corresponds to a joint of a second phalanx junction of the ring finger, P16 corresponds to a fingertip of the ring finger, P17 corresponds to a finger end of a little finger, P18 corresponds to a joint of a first phalanx of the little finger, P19 corresponds to a joint of a second phalanx of the little finger, P20 corresponds to a fingertip of the little finger, and P0 corresponds to an end of a palm.

In an exemplary embodiment, an infrared image of the hand taken by the gesture detection camera is acquired, and the key nodes of the 21 parts of the hand are distinguished according to light and shade, and then three-dimensional coordinates of each key node are obtained and denoted as Hand3D. The three-dimensional coordinates of the key nodes of the hand may be mapped to a two-dimensional image of the gesture detection module, and a mapping matrix is denoted as M4, wherein a coordinate of each key node on the two-dimensional image is Hand2D=M4*Hand3D.

In this embodiment, a process of detecting whether the user's hand collides with the virtual target object and/or grabs the virtual target object according to the hand image may be realized by using an existing gesture detection approach, which is not limited by the present disclosure.

In an exemplary embodiment, detecting whether the user's hand collides with the virtual target object and/or grabs the virtual target object according to the hand image includes the following acts.

In act 301, the user's hand is detected, and position data of key nodes corresponding to the detected hand is set up.

In act 302, a virtual sphere is fitted according to the position data of the key nodes of the hand, and the position data of the virtual sphere is obtained.

In act 303, the position data of the virtual target object, the position data of the key nodes of the hand and the position data of the virtual sphere are put into a preset function; wherein it is determined that the user's hand collides with the virtual target object and a predetermined grabbing force is exerted when a condition set by the preset function is satisfied.

Since gesture detection is mainly used to determine whether a hand collides with the virtual target object, and whether the hand grabs the virtual target object, actions of collision and grabbing are mainly carried out during a motion process of the hand, position data of multiple key nodes of the hand may be fitted into a virtual sphere regardless of a size of the hand, a bending radian of the hand, and how the grabbing action changes. Besides, since the key nodes of the hand have been represented by coordinate data, the virtual sphere obtained by fitting will also be a sphere represented by three-dimensional coordinate data. As user's hand motions and positions change, position data of the corresponding virtual sphere may be obtained.

In an exemplary embodiment, there are multiple ways to fit the position data of the key nodes of the hand into a virtual sphere, such as data fitting using a mathematical modeling formula, fitting directly using a preset software program, etc. The embodiments of the present disclosure do not limit the fitting ways.

Figure 6:
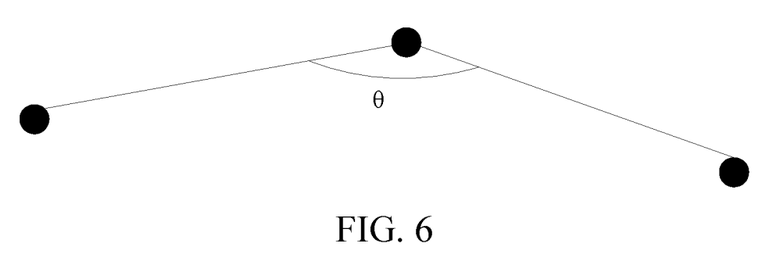
FIG. 6 is a schematic diagram of a bending level of a finger according to an embodiment of the present disclosure.

In an exemplary embodiment, the position data of the key nodes of the hand may be fitted to obtain the virtual sphere when a first preset condition is satisfied, and position data S (x0, y0, z0, r) of the virtual sphere is obtained. Herein, (x0, y0, z0) is a spherical center coordinate of the virtual sphere in the three-dimensional coordinate system, and R is a radius of the virtual sphere in the three-dimensional coordinate system. The first preset condition is that a bending level of each finger of the hand is θ and is within a preset range. As shown in FIG. 6, the bending level θ of the finger refers to an angle formed by a fingertip, a metacarpophalangeal joint (i.e., the aforementioned joint of the first phalanx near the end of the finger) and a finger end of each finger. A bending level of the thumb is θ1, a bending level of the index finger is θ2, a bending level of the middle finger is θ3, a bending level of the ring finger is θ4 and a bending level of the little finger is θ5. θ1, θ2, θ3, θ4 and θ5 are all smaller than or equal to 165 degrees; θ1, θ2, θ3 and θ4 are all greater than or equal to 30 degrees; θ5 is greater than or equal to 105 degrees. That is, in the first preset condition the hand needs to have a certain bending level, and a grabbing force is proportional to the bending level. A stretched hand does not meet conditions of fitting into a virtual sphere, because the stretched hand does not meet the condition of grabbing objects. Thereby it can be further understood why the position data of the key nodes of the hand is fitted into the virtual sphere.

In an exemplary embodiment, the position data of the virtual target object, the position data of the key nodes of the hand and the position data of the virtual sphere may be put into a preset function; wherein it is determined that the user's hand collides with the virtual target object and a predetermined grabbing force is exerted when a condition set by the preset function is satisfied.

In an exemplary embodiment, the preset function is its condition, which may be directly stored in a system or a processor. In use, after obtaining the above data, the preset function may be directly used to judge and calculate to obtain a gesture, for example, to obtain that the user's hand collides with the virtual target object, or to obtain that when the hand collides with the virtual target object, a certain grabbing force is exerted to the virtual target object, and moreover, the grabbing force of the hand is calculated out.

In an exemplary embodiment, the preset function includes a first function and a second function, which are:

$$D1 = \sqrt{(x_{obj} - x_o)^2 + (y_{obj} - y_o)^2 + (z_{obj} - z_o)^2} < R;$$

-continued $$D2 = \frac{1}{5}\Sigma_{i=1}^{5}\sqrt{(x_{obj} - x_i)^2 + (y_{obj} - y_i)^2 + (z_{obj} - z_i)^2} < R;$$

Where D1 is a distance between a center of the virtual target object and a center of the virtual sphere, and D2 is a distance between fingertips of the five fingers of the hand and the center of the virtual target object; i ranges from 1 to 5, representing position data of the fingertip of the thumb to position data of the fingertip of the little finger, respectively. In this way, when the position data of the virtual target object, the position data of the key nodes of the hand and the position data of the virtual sphere satisfy the first function and the second function, it is determined that the hand collides with the virtual target object.

In an exemplary embodiment, the preset function may further include a third function:

$$F = \sum_{i=1}^{5} \alpha_i * \theta_i'$$

Where $\theta_i'$ is a bending level corresponding to each finger of the hand of which the bending level is normalized between (1, 0); $\alpha_1$ is a weight coefficient of each finger's force when grabbing an object, including: a thumb weight coefficient $\alpha_1$, an index finger weight coefficient $\alpha_2$, a middle finger weight coefficient $\alpha_3$, a ring finger weight coefficient $\alpha_4$ and a little finger weight coefficient $\alpha_5$; the value of $\alpha_1$ ranges from 0.3 to 0.4, the value of $\alpha_2$ ranges from 0.2 to 0.3, the value of $\alpha_3$ ranges from 0.15 to 0.25, the value of $\alpha_4$ ranges from 0.1 to 0.2, and the value of $\alpha_5$ ranges from 0 to 0.1, $\alpha_1 > \alpha_2 > \alpha_3 > \alpha_4 > \alpha_5$, $\alpha_1 + \alpha_2 + \alpha_3 + \alpha_4 + \alpha_5 = 1$.

Known from experiments, when the grabbing force F>2.5, it may be determined that the virtual target object is grabbed by the hand. Therefore, when the hand collides with the virtual target object, that is, when the position data of the virtual target object, the position data of the key nodes of the hand and the position data of the virtual sphere satisfy the first function and the second function, the grabbing force F exerted by the hand on the virtual target object may be obtained by correspondingly putting the position data of the key nodes of the hand into the third function.

In the technical scheme of the present disclosure, the position data of the key nodes of the user's hand and the position data of the virtual target object are detected and set up, and the position data of the fitted virtual sphere may be obtained according to the position data of the key nodes, and then that the hand collides with the virtual target object and the exerted grabbing force may be obtained precisely by further using the above data and the preset function formulas.

In this embodiment, the position data of the key nodes of the users' hands are fitted into a virtual sphere, and the virtual sphere is used for detection. The virtual sphere may set up virtual spheres with corresponding spherical center position data and corresponding radius data according to different users' hands with different sizes and hands in different motion states, thus a problem of complicated structures and diversity of motions of users' hands is solved, and thereby the data detected and set up in this method may be directly put into the preset formula to obtain a detection result of the gesture collision, which greatly reduces complexity of the calculation.

In act 40, playing of the 3D view is controlled according to whether the human eyes gaze at the virtual target object, whether the user's hand collides with the virtual target object and grabs the virtual target object.

In an exemplary embodiment, the act 40 includes: rendering one part of the 3D view in high definition and rendering the other part of the 3D view in low definition when human eyes gaze at the virtual target object, in this case, one part of the 3D view corresponds to a first region around the eye gaze region when human eyes gaze at the virtual target object and the user's hand does not collide with the virtual target object; the part of the 3D view corresponds to a second region around the eye gaze region when human eyes gaze at the virtual target object and the user's hand collides with the virtual target object, wherein the second region is greater than or equal to the first region; and rendering the whole 3D view in low definition when human eyes do not gaze at the virtual target object.

In an exemplary embodiment, the act 40 further includes: calculating a motion vector of the user's hand when the user's hand grabs the virtual target object, and updating a position of the virtual target object according to the calculated motion vector.

A bandwidth of the display is reduced in an embodiment of the present disclosure by display locally in high definition. Rendering in high definition described in embodiments of the present disclosure means that a format of an output image frame is above 1080P (P refers to Progressive indicating progressive scanning), and correspondingly, rendering in low definition described in embodiments of the present disclosure means that a format of an output image frame is below 1080P.

In an exemplary embodiment, when human eyes gaze at the virtual target object and the user's hand collides with the virtual target object, the method further includes the following acts: determining a collision region of the user's hand on the virtual target object; wherein the second region is centered on the eye gaze region when the eye gaze region does not overlap the collision region; the second region is centered on a region where the eye gaze region overlaps the collision region when the eye gaze region overlaps the collision region.

As shown in FIG. 2, there are a triangle target for generating a left view and a triangle target for generating a right view on a screen of the glasses' free 3D display, and an image of the virtual target object seen by human eyes is in front of the screen due to parallax. An imaging center of the virtual target object in a three-dimensional space is denoted as Visual3D_Object, and a space outer enclosing box occupied by the virtual target object is denoted as Visual3D_box. The eye gaze region is calculated through the above acts, which may be classified into the following two situations.

(1) The eye gaze region falls within the Visual3D_box, which means that human eyes are gazing at the virtual target object. In this case, a threshold a is set, and the number of rendering pixels of the display screen is increased in an a region around the eye gaze region to achieve high-definition rendering, while low-definition rendering is performed in other regions, thereby reducing a bandwidth. In this case, whether the gesture collides with the virtual target object is calculated through the previous acts. If it collides, a threshold value β is set in this case, and β>α, and the region is further expanded, that is, the number of the rendering pixels of the display screen is increased in a region where both the human eyes and the gesture work to achieve a high-definition display, while a low-definition display is performed in other regions, thereby reducing the bandwidth.

(2) The eye gaze region falls out of the Visual3D_box, which means that human eyes do not gaze the interactive object. In this case, the low-definition rendering is performed on the whole 3D view.

When the eye gaze region and the gesture are within the Visual3D_box, a glasses' free 3D content interaction algorithm is started. When the hand collides with the virtual target object, a state of the hand is detected to determine whether the hand is grabbing the virtual target object. If yes, a current position of the gesture is calculated in real time. A position when the gesture just collided with the virtual target object is A1, and a position after the movement is A2, so a vector A=A2−A1, and A is a motion vector of the gesture. The motion of A is put into the left and right views of the virtual target object, and positions of the virtual target object in the left and right views are calculated through the positions in the three-dimensional space and the vector A, and then an updated position is displayed in the glasses' free 3D display.

In the human-machine interaction method according to the embodiment of the present disclosure, playing of the 3D view is controlled according to whether human eyes gaze at the virtual target object, whether the user's hand collides with the virtual target object and grabs the virtual target object, so that an effect of hand-eye integration during the human-machine interaction is achieved, and gesture control may more truly reflect people's interaction behaviors, furthermore, user's immersion is improved, and a capability of the glasses' free 3D in the human-machine interaction direction is improved, greatly promoting development of the glasses' free 3D in interaction.

In addition, the bandwidth of the display is decreased through performing high-definition rendering on the interactive region and performing low-definition rendering on other regions.

An embodiment of the present disclosure further provides a processing device, which may include a processor and a memory storing a computer program that may run on the processor, wherein the acts of the human-machine interaction method described in any embodiment of the present disclosure are implemented when the processor executes the computer program.

Figure 7:
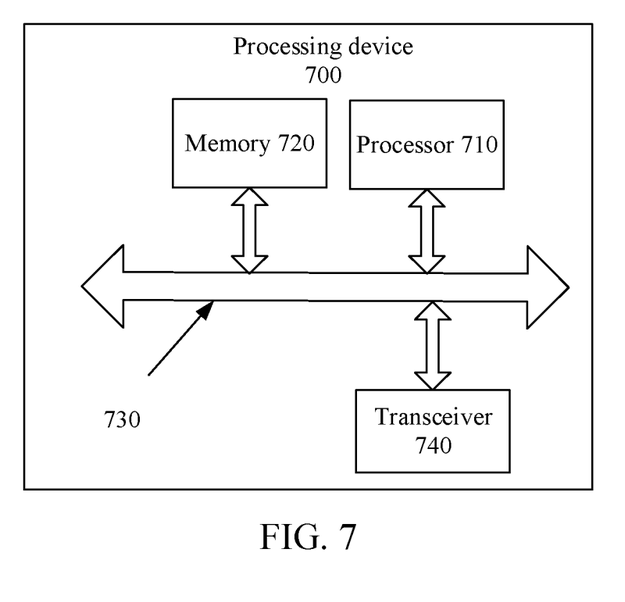
FIG. 7 is a schematic diagram of a structure of a processing device according to an embodiment of the present disclosure.

As shown in FIG. 7, in an example, the processing device 700 may include a processor 710, a memory 720, a bus system 730 and a transceiver 740, wherein the processor 710, the memory 720 and the transceiver 740 are connected via the bus system 730, the memory 720 is used for storing instructions, and the processor 710 is used for executing instructions stored in the memory 720 to control the transceiver 740 to send signals. In an exemplary embodiment, under a control of the processor 710, the transceiver 740 may acquire collected original images from the sight tracking camera and the gesture detection camera, and send a notification to other devices through the transceiver after the eye gaze region, whether the user's hand collides with the virtual target object or grabs the virtual target object are detected.

It should be understood that the processor 710 may be a Central Processing Unit (CPU), or the processor 710 may be another general-purpose processor, a digital signal processor (DSP), an application specific integrated circuit (ASIC), a field programmable gate array (FPGA) or other programmable logic devices, a discrete gate or transistor logic device, a discrete hardware component, etc. The general-purpose processor may be a microprocessor, or the processor may be any conventional processor.

The memory 720 may include a read-only memory and a random access memory, and provides instructions and data to the processor 710. A portion of the memory 720 may also include a non-volatile random access memory. For example, the memory 720 may also store information of device types.

The bus system 730 may include a power bus, a control bus, a status signal bus, and the like in addition to a data bus. However, for clarity of illustration, various buses are denoted as the bus system 730 in FIG. 7.

In an implementation process, the processing performed by the processing device may be completed by an integrated logic circuit of hardware in the processor 710 or instructions in the form of software. That is, the acts of the method in the embodiments of the present disclosure may be embodied as the execution of hardware processor, or the execution of a combination of hardware in the processor and software modules. The software modules may be located in a storage medium, such as a random access memory, a flash memory, a read-only memory, a programmable read-only memory, an electrically erasable programmable memory, or a register. The storage medium is located in the memory 720, and the processor 710 reads the information in the memory 720 and completes the acts of the above method in combination with its hardware. To avoid repetition, the detail will not be described here.

An embodiment of the present disclosure further provides a human-machine interaction system, which includes a sight tracking camera, a gesture detection camera, a 3D display and a processing device. The processing device may be the processing device 700 as described above. The sight tracking camera is configured to take a user image; the gesture detection camera is configured to take a user hand image; and the 3D display is configured to output a 3D view to present a virtual target object.

In an exemplary embodiment, as shown in FIG. 3, the sight tracking camera includes a first camera 31 and a second camera 32, and the human-machine interaction system further includes two infrared light sources 34 for forming light spots on human eyes.

In an exemplary embodiment, the first camera 31 may be a red, green and blue (RGB) camera, the second camera 32 may be an infrared camera, and the gesture detection camera 33 may be an infrared camera.

In an exemplary embodiment, the first camera 31 and the second camera 32 are calibrated by using Zhang Zhengyou's chessboard calibration method to obtain a rotation translation matrix from the first camera 31 to the second camera 32, which is denoted as M1, so that an Image_rgb of the first camera 31 is transformed into an image of the second camera 32 through M1, that is, Image_ir=M1*Image_rgb. In a similar way, the second camera 32 and the gesture detection camera 33 are calibrated to obtain a rotation translation matrix M2 from the second camera 32 to the gesture detection camera 33, so that an Image_ir of the second camera 32 is transformed into an image of the gesture detection camera through M2, that is, Image hand=M2*image_ir.

An embodiment of the present disclosure further provides a non-transitory computer readable storage medium storing executable instructions thereon. When the executable instructions are executed by a processor, the human-machine interaction method as described in any one of the above embodiments of the present disclosure is implemented. The human-machine interaction method may be used for controlling the 3D display according to the above embodiments of the present disclosure to output a 3D view and control playing of the 3D view, thereby achieving an effect of hand-eye integration during the human-machine interaction, so that gesture control may more truly reflect people's interactive behaviors, users' immersion and a capability of the glasses' free 3D in a direction of human-machine interaction are improved, greatly promoting development of the glasses' free 3D in interaction. The method for driving the human-machine interaction system to perform 3D view play-control by executing executable instructions is basically the same as the human-machine interaction method provided in the above-mentioned embodiments of the present disclosure, which will not be further described here.

In the description for embodiments of the present disclosure, it should be understood that an orientation or position relationship indicated by the terms "middle", "upper", "lower", "front", "rear", "vertical", "horizontal", "top", "bottom", "inner", "outer" and the like is based on the orientation or position relationship shown in the accompanying drawings, which is only for the convenience of describing the present disclosure and simplifying the description, rather than indicating or implying that the apparatus or element referred to must have the specific orientation, or be constructed and operated in the specific orientation, and thus may not be interpreted as a limitation on the present disclosure.

In the description for embodiments of the present disclosure, unless otherwise clearly specified and defined, the terms "install", "connect", "couple" should be broadly interpreted, for example, it may be connected fixedly or connected detachably, or integrated; it may be a mechanical connection or an electrical connection; it may be directly connected, or may be indirectly connected through an intermediary, or may be an internal connection between two elements. Those of ordinary skill in the art may understand the specific meanings of the above mentioned terms in the present disclosure according to specific situations.

Those of ordinary skill in the art may understand that all or some of the acts in the method, the system, and functional modules/units in the apparatus disclosed above may be implemented as software, firmware, hardware, and an appropriate combination thereof. In a hardware implementation, the division between functional modules/units mentioned in the above description does not necessarily correspond to the division of physical components. For example, a physical component may have multiple functions, or a function or an act may be performed by several physical components in cooperation. Some or all of the components may be implemented as software executed by a processor, such as a digital signal processor or a microprocessor, or as hardware, or as an integrated circuit, such as an application specific integrated circuit. Such software may be distributed on a computer readable medium, which may include a computer storage medium (or a non-transitory medium) and a communication medium (or a transitory medium). As is well known to those of ordinary skill in the art, the term "computer storage medium" includes volatile and nonvolatile, removable and non-removable media implemented in any method or technology for storing information (such as computer readable instructions, a data structure, a program module or other data). The computer storage medium includes, but is not limited to, a RAM, a ROM, an EEPROM, a flash memory or another memory technology, a CD-ROM, a digital versatile disk (DVD) or another optical disk storage, a magnetic cassette, a magnetic tape, a magnetic disk storage or another magnetic storage device, or any other medium that may be used for storing desired information and may be accessed by a computer. Furthermore, it is well known to those of ordinary skill in the art that the communication medium typically contains computer readable instructions, a data structure, a program module, or other data in a modulated data signal such as a carrier or another transmission mechanism, and may include any information delivery medium.

Although the implementations disclosed in the present disclosure are as described above, the described contents are only the implementations for facilitating understanding of the present disclosure, which are not intended to limit the present disclosure. Any person skilled in the art to which the present disclosure pertains may make any modifications and variations in the form and details of implementations without departing from the spirit and the scope disclosed by the present disclosure, but the protection scope of the present disclosure shall still be subject to the scope defined in the appended claims.

What we claim is:

1. A human-machine interaction method, comprising:
    controlling a 3D display to output a 3D view, wherein a virtual target object is presented by the 3D view;
    receiving a user image taken by a sight tracking camera, and detecting an eye gaze region according to the user image;
    receiving a hand image taken by a gesture detection camera, and detecting whether a user's hand collides with the virtual target object and/or grabs the virtual target object according to the hand image;
    controlling playing of the 3D view according to whether human eyes gaze at the virtual target object, whether the user's hand collides with the virtual target object and grasps the virtual target object;
    wherein detecting whether the user's hand collides with the virtual target object and/or grabs the virtual target object according to the hand image comprises:
    preselecting a plurality of parts of the hand as key nodes of the hand;
    acquiring the hand image taken by the gesture detection camera, determining position data of the key nodes of the hand, and detecting whether the user's hand collides with the virtual target object according to a position of the virtual target object and the position data of the key nodes of the hand; and
    detecting whether the user's hand grabs the virtual target object when the user's hand collides with the virtual target object.

2. The human-machine interaction method of claim 1, wherein the sight tracking camera comprises a first camera and a second camera, and detecting the eye gaze region according to the user image comprises:
    acquiring a user image taken by the first camera, performing face detection and landmark detection on the user image to obtain a plurality of face landmarks, and calculating face position and pose information according to the plurality of face landmarks;
    performing pupil detection on an eye region of a face to determine a pupil region; performing binary processing on the user image, calculating an integral image of the pupil region, and determining a position of a pupil center;
    acquiring an eye image with a light spot taken by the second camera, detecting a position of the light spot, and calculating the eye gaze region according to the position of the pupil center and the position of the light spot.

3. The human-machine interaction method of claim 2, wherein before controlling the 3D display to output the 3D view, the method further comprises:

calibrating the first camera and the second camera to obtain a first rotation translation matrix between the first camera and the second camera; and calibrating the second camera and the gesture detection camera to obtain a second rotation translation matrix between the second camera and the gesture detection camera.

4. The human-machine interaction method of claim 1, wherein preselecting the plurality of parts of the hand as key nodes of the hand comprises:

preselecting twenty-one parts of the hand as key nodes of the hand, wherein the twenty-one parts of the hand comprise four parts of each of five fingers, wherein a fingertip is a part, three joints correspond to three parts, and there is a part at a wrist.

5. The human-machine interaction method of claim 1, wherein controlling the playing of the 3D view according to whether human eyes gaze at the virtual target object, whether the user's hand collides with the virtual target object and grasps the virtual target object comprises:

rendering one part of the 3D view in high definition and rendering the other part of the 3D view in low definition when human eyes gaze at the virtual target object, in this case, the one part of the 3D view corresponds to a first region around the eye gaze region when human eyes gaze at the virtual target object and the user's hand does not collide with the virtual target object; the one part of the 3D view corresponds to a second region around the eye gaze region when human eyes gaze at the virtual target object and the user's hand collides with the virtual target object, wherein the second region is greater than or equal to the first region; and rendering the whole 3D view in low definition when human eyes do not gaze at the virtual target object.

6. The human-machine interaction method of claim 5, further comprising:

calculating a motion vector of the user's hand when the user's hand grabs the virtual target object, and updating a position of the virtual target object according to the calculated motion vector.

7. The human-machine interaction method of claim 5, wherein when human eyes gaze at the virtual target object and the user's hand collides with the virtual target object, the method further comprises:

determining a collision region of the user's hand on the virtual target object;

wherein the second region is centered on the eye gaze region when the eye gaze region does not overlap the collision region;

the second region is centered on a region where the eye gaze region overlaps the collision region when the eye gaze region overlaps the collision region.

8. The human-machine interaction method of claim 1, wherein the 3D view comprises a first background display content, a second background display content, a first foreground interactive object and a second foreground interactive object, which are superimposed on each other, wherein the first background display content and the second background display content form a glasses' free 3D scene after being imaged by human eyes, and the first foreground interactive object and the second foreground interactive object form the virtual target object after being imaged by the human eyes.

9. A processing device, comprising: a processor and a memory storing a computer program that is capable of running on the processor, wherein a human-machine inter-action method is implemented when the processor executes the computer program, and the human-machine interaction method comprises:

controlling a 3D display to output a 3D view, wherein a virtual target object is presented by the 3D view;

receiving a user image taken by a sight tracking camera, and detecting an eye gaze region according to the user image;

receiving a hand image taken by a gesture detection camera, and detecting whether a user's hand collides with the virtual target object and/or grabs the virtual target object according to the hand image;

controlling playing of the 3D view according to whether human eyes gaze at the virtual target object, whether the user's hand collides with the virtual target object and grasps the virtual target object;

wherein detecting whether the user's hand collides with the virtual target object and/or grabs the virtual target object according to the hand image comprises:

preselecting a plurality of parts of the hand as key nodes of the hand;

acquiring the hand image taken by the gesture detection camera, determining position data of the key nodes of the hand, and detecting whether the user's hand collides with the virtual target object according to a position of the virtual target object and the position data of the key nodes of the hand; and detecting whether the user's hand grabs the virtual target object when the user's hand collides with the virtual target object.

10. The processing device of claim 9, wherein the sight tracking camera comprises a first camera and a second camera, and detecting the eye gaze region according to the user image comprises:

acquiring a user image taken by the first camera, performing face detection and landmark detection on the user image to obtain a plurality of face landmarks, and calculating face position and pose information according to the plurality of face landmarks;

performing pupil detection on an eye region of a face to determine a pupil region; performing binary processing on the user image, calculating an integral image of the pupil region, and determining a position of a pupil center; and acquiring an eye image with a light spot taken by the second camera, detecting a position of the light spot, and calculating the eye gaze region according to the position of the pupil center and the position of the light spot.

11. The processing device of claim 10, wherein before the processor executes an act of controlling the 3D display to output the 3D view, the processor further executes the following acts:

calibrating the first camera and the second camera to obtain a first rotation translation matrix between the first camera and the second camera; and calibrating the second camera and the gesture detection camera to obtain a second rotation translation matrix between the second camera and the gesture detection camera.

12. The processing device of claim 9, wherein controlling the playing of the 3D view according to whether human eyes gaze at the virtual target object, whether the user's hand collides with the virtual target object and grasps the virtual target object comprises:

rendering one part of the 3D view in high definition and rendering the other part of the 3D view in low definition when human eyes gaze at the virtual target object, in this case, the one part of the 3D view corresponds to a first region around the eye gaze region when human eyes gaze at the virtual target object and the user's hand does not collide with the virtual target object; the one part of the 3D view corresponds to a second region around the eye gaze region when human eyes gaze at the virtual target object and the user's hand collides with the virtual target object, wherein the second region is greater than or equal to the first region; and rendering the whole 3D view in low definition when human eyes do not gaze at the virtual target object.

13. The processing device of claim 12, wherein controlling the playing of the 3D view according to whether human eyes gaze at the virtual target object, whether the user's hand collides with the virtual target object and grasps the virtual target object, and the processor further executes the following act:

calculating a motion vector of the user's hand when the user's hand grasps the virtual target object and updating a position of the virtual target object according to the calculated motion vector.

14. The processing device of claim 12, wherein when human eyes gaze at the virtual target object and the user's hand collides with the virtual target object, the processor further executes the following act:

determining a collision region of the user's hand on the virtual target object;

wherein the second region is centered on the eye gaze region when the eye gaze region does not overlap the collision region;

the second region is centered on a region where the eye gaze region overlaps the collision region when the eye gaze region overlaps the collision region.

15. A human-machine interaction system, comprising a sight tracking camera, a gesture detection camera, a 3D display and the processing device of claim 11, wherein:

the sight tracking camera is configured to take a user image;

the gesture detection camera is configured to take a hand image of a user; and the 3D display is configured to output a 3D view to present a virtual target object.

16. The human-machine interaction system of claim 15, wherein the sight tracking camera comprises a first camera and a second camera, and the human-machine interaction system further comprises two infrared light sources for forming light spots on human eyes;

the first camera is a red, green and blue camera, the second camera is an infrared camera and the gesture detection camera is an infrared camera.

17. A non-transitory computer readable storage medium storing computer-executable instructions thereon, wherein the computer-executable instructions are used for executing a human-machine interaction method, which comprises:

controlling a 3D display to output a 3D view, wherein a virtual target object is presented by the 3D view;

receiving a user image taken by a sight tracking camera, and detecting an eye gaze region according to the user image;

receiving a hand image taken by a gesture detection camera, and detecting whether a user's hand collides with the virtual target object and/or grabs the virtual target object according to the hand image;

controlling playing of the 3D view according to whether human eyes gaze at the virtual target object, whether the user's hand collides with the virtual target object and grasps the virtual target object;

wherein detecting whether the user's hand collides with the virtual target object and/or grabs the virtual target object according to the hand image comprises:

preselecting a plurality of parts of the hand as key nodes of the hand;

acquiring the hand image taken by the gesture detection camera, determining position data of the key nodes of the hand, and detecting whether the user's hand collides with the virtual target object according to a position of the virtual target object and the position data of the key nodes of the hand; and detecting whether the user's hand grabs the virtual target object when the user's hand collides with the virtual target object.

* * * * *